No. 758,190. Patented April 26, 1904.

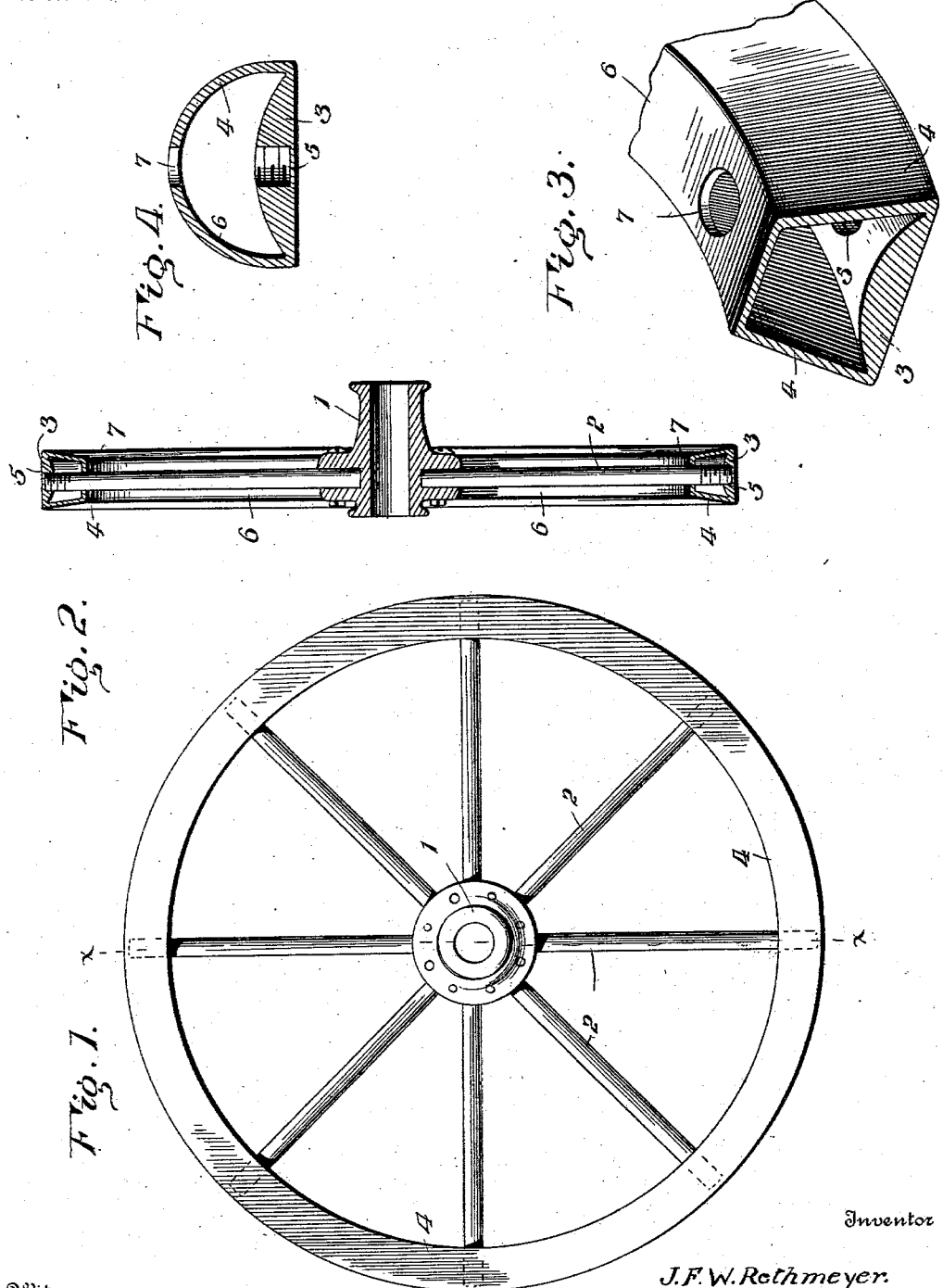

UNITED STATES PATENT OFFICE.

JOHN F. W. RETHMEYER, OF LYON, MISSOURI.

WHEEL-RIM.

SPECIFICATION forming part of Letters Patent No. 758,190, dated April 26, 1904.

Application filed September 8, 1903. Serial No. 172,340. (No model.)

*To all whom it may concern:*

Be it known that I, JOHN F. W. RETHMEYER, a citizen of the United States, residing at Lyon, in the county of Franklin and State of Missouri, have invented certain new and useful Improvements in Wheel-Rims, of which the following is a specification.

The primary object of this invention is to prevent mud from collecting upon the inner side of the rim of a wheel designed either for agricultural machinery or road-vehicles, thereby obviating the accumulation of mud upon the spokes, hub, and adjacent portion of the implement or vehicle equipped with a wheel embodying the invention.

The wheel, for whatever use designed, either for agricultural machinery or road-vehicles, is provided with a hollow rim of such depth as to guard against mud closing over the rim and falling downward upon the spokes and hubs as the wheel rotates in the forward movement of the machine or vehicle supported thereby. The vital feature of the invention is to construct the rim as light as possible consistent with strength and durability and to minimize the cost and to obviate unnecessary adding to the weight of the wheel and giving the same a clumsy appearance.

In the accompanying drawings, forming a part of this specification, Figure 1 is a side view of a wheel embodying the invention. Fig. 2 is a transverse section thereof on the line X X of Fig. 1, the perpendicular spokes being in full. Fig. 3 is a perspective view of a portion of the hollow rim on a larger scale. Fig. 4 is a sectional view similar to Fig. 2, showing a modification.

Corresponding and like parts are referred to in the following description and indicated in all the views of the drawings by the same reference characters.

The wheel with respect to the hub 1 and spokes 2 may be of any structural type and size, according to its specific use.

The rim is hollow and may be constructed in any manner found most advantageous. However, it is preferred to have the inclosing walls or parts integrally formed. The tread portion 3 of the rim is thickened at a central point and tapers transversely toward the sides 4 and is provided at intervals with openings or sockets 5 for receiving the outer end of the spokes 2, which may be connected thereto in any substantial way. The sides 4 are inwardly converged, so as to prevent the mud pressed outward by the tread portion 3 collecting on the outer faces thereof. The sides 4 may be of any depth so as to insure the attainment of the objects of the invention under ordinary conditions. The inner wall 6 joins the inner edges of the sides 4 and is apertured, as shown at 7, in coincident relation with the sockets or openings 5 to receive the outer ends of the spokes 2, as indicated most clearly in Fig. 2.

The component parts of the wheel may be assembled in any determinate way, and the hollow rim may be manufactured in any manner found most economical and best adapted to the particular pattern or design of wheel embodying the invention.

In practice a wheel embodying the invention when moving over a muddy road or soft ground will prevent the earth closing over the inner side or wall 6 of the rim. Hence the wheel will not collect mud and earth and become heavy and stick and require the driver to clear the same before progress may be made.

In the form shown in Fig. 4 the sides of the rim and the inner wall instead of being straight are curved, this form being preferable in some instances and involving a cheaper construction.

Having thus described the invention, what is claimed as new is—

1. A wheel having a hollow rim, the tread portion of which is inwardly thickened at the center and tapered upon its inner side transversely from a medial line toward the sides, and spoke-sockets formed in said thickened part of the rim, closed at their outer ends and opening at their inner ends into the space of the rim, substantially as specified.

2. In a wheel, a hollow rim, formed of integral inclosing walls, the tread portion of the rim having its middle portion thickened and transversely tapered from a medial line, and having sockets in the thickened part of the rim closed at their outer ends, and having openings in the inner wall of the rim in line with the sockets to coöperate therewith for reception of the outer ends of the spokes, substantially as set forth.

In testimony whereof I affix my signature in presence of two witnesses.

JOHN F. W. RETHMEYER. [L. S.]

Witnesses:
  LOUIS F. ZIEGENMEYER,
  WM. POPPENHUSEN.